C. A. PRATT.
STORAGE BATTERY LOCOMOTIVE.
APPLICATION FILED MAY 5, 1917.
1,424,849.
Patented Aug. 8, 1922.
4 SHEETS—SHEET 1.
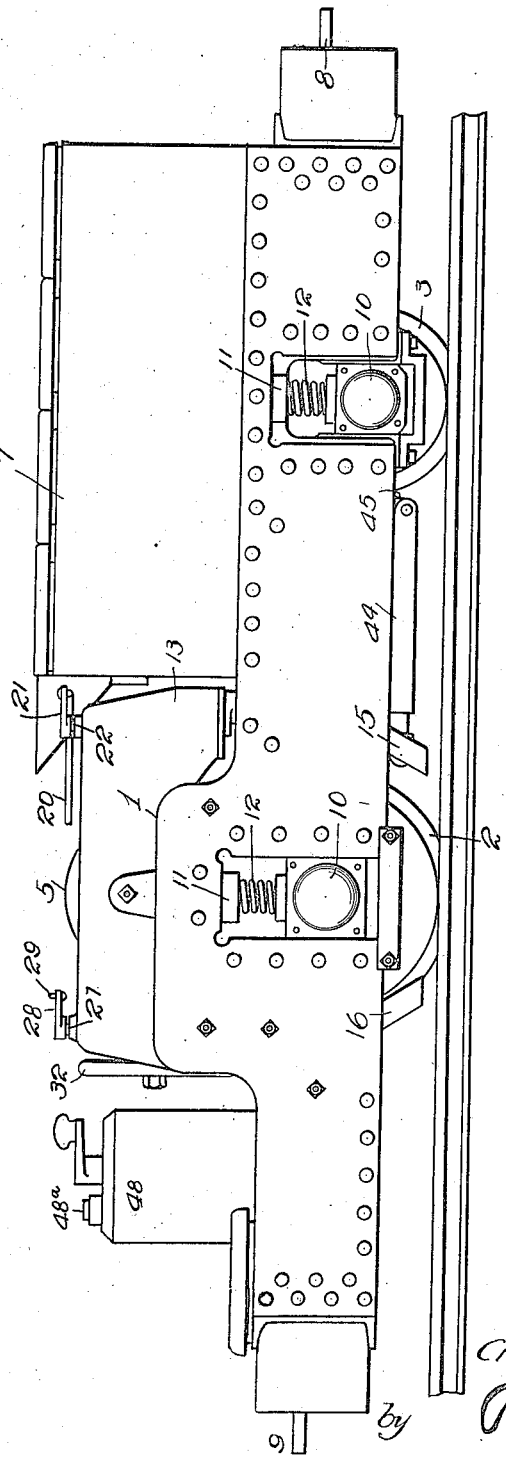

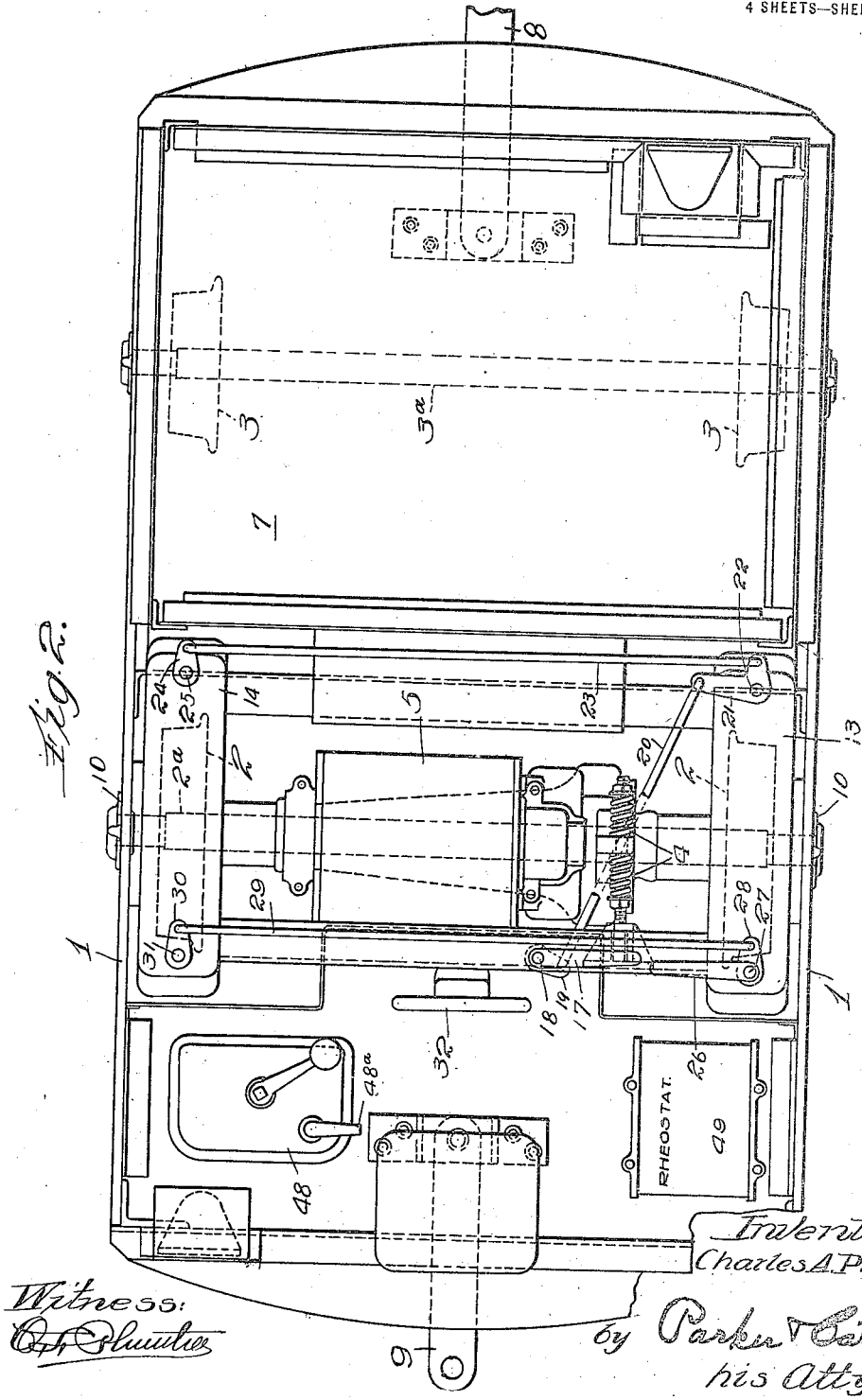

C. A. PRATT.
STORAGE BATTERY LOCOMOTIVE.
APPLICATION FILED MAY 5, 1917.
1,424,849.
Patented Aug. 8, 1922.
4 SHEETS—SHEET 3.
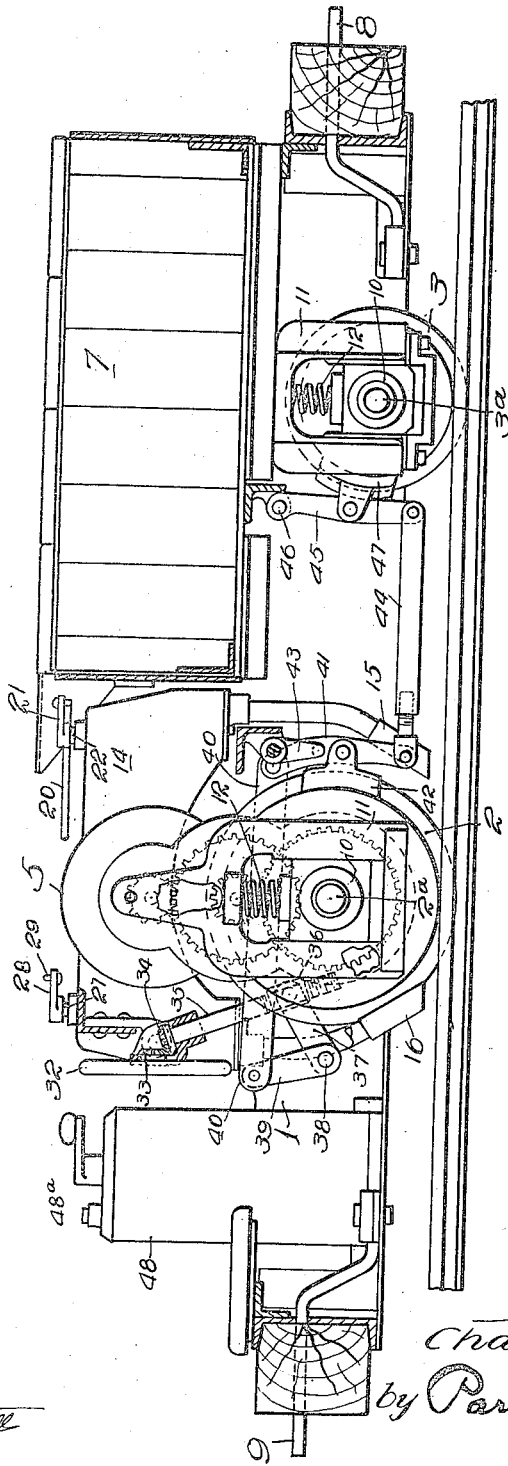

C. A. PRATT.
STORAGE BATTERY LOCOMOTIVE.
APPLICATION FILED MAY 5, 1917.
1,424,849.
Patented Aug. 8, 1922.
4 SHEETS—SHEET 4.
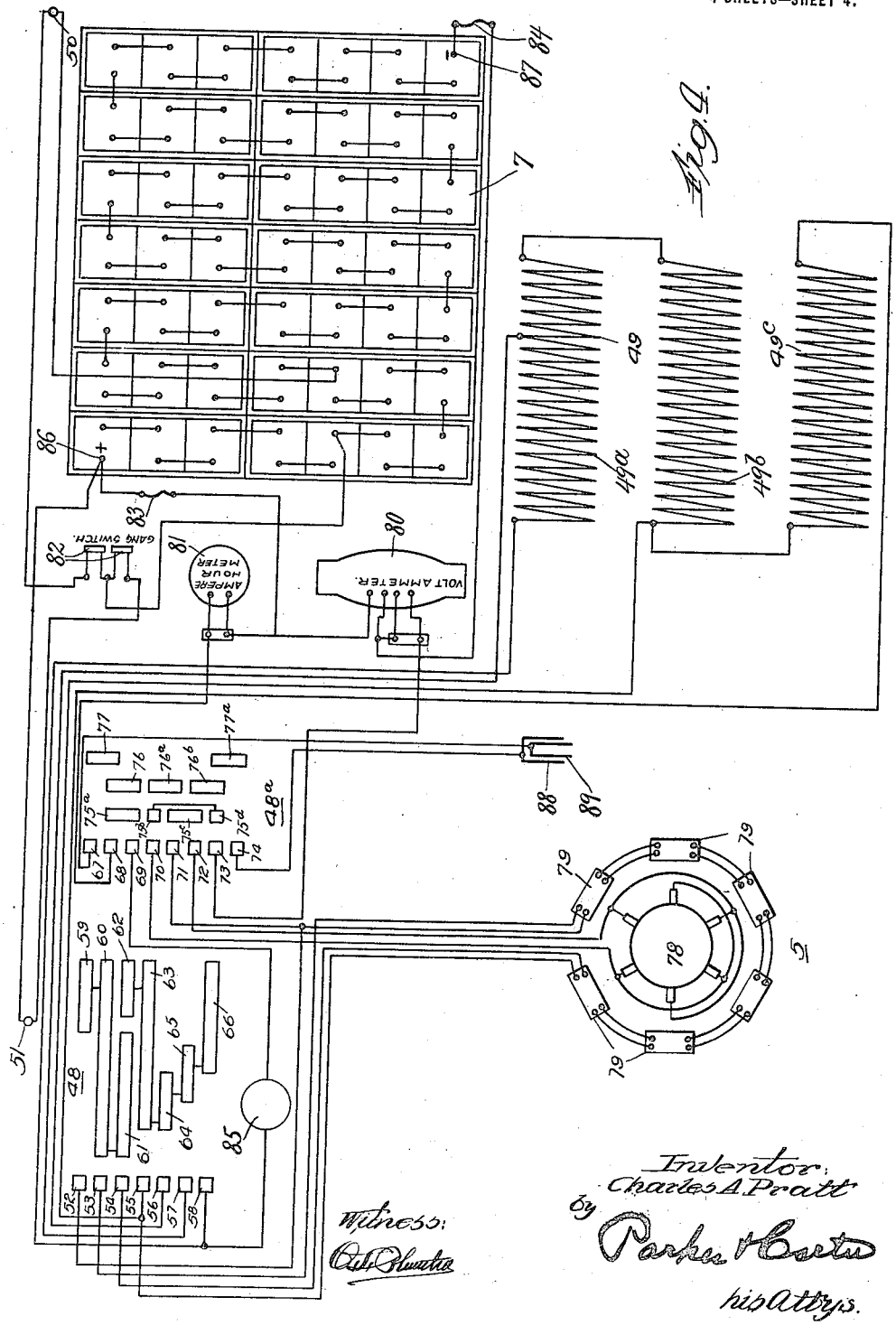

UNITED STATES PATENT OFFICE.

CHARLES A. PRATT, OF CHICAGO, ILLINOIS, ASSIGNOR TO GOODMAN MANUFACTURING COMPANY, OF CHICAGO, ILLINOIS, A CORPORATION OF ILLINOIS.

STORAGE-BATTERY LOCOMOTIVE.

1,424,849.

Specification of Letters Patent.   Patented Aug. 8, 1922.

Application filed May 5, 1917. Serial No. 166,514.

*To all whom it may concern:*

Be it known that I, CHARLES A. PRATT, a citizen of the United States, residing at Chicago, in the county of Cook and State of Illinois, have invented a certain new and useful Improvement in Storage-Battery Locomotives, of which the following is a specification.

This invention relates to storage battery locomotives and has for its object to provide a new and improved locomotive of this description. In the manufacture and use of storage battery locomotives there are certain peculiar and difficult problems presented for solution due to the conditions presented in mines. For example, the locomotive must be low in the great majority of cases because the roofs of the entries and working places in the mines, where the locomotives must go, are low and the locomotive must easily and safely pass under these roofs. This limits the form and shape, and hence, the disposition of the storage battery. Again, the cars carrying the coal must be moved a certain distance and the locomotive must be run a certain number of trips in order to do the day's work required. All of these conditions must be taken into consideration in providing a practical and commercial storage battery locomotive. In the particular construction herein shown there are broadly considered three elements, a wheeled frame, a motor and the controlling apparatus therefor, and a storage battery, and to secure the results desired, they must be related in a particular manner—and this relation varies with, and depends upon, the conditions presented at the mine. There must, for example, be a certain weight upon the driving wheels to secure the desired and called-for draw-bar pull. The motor must be a certain size to secure this draw-bar pull with this weight, at a specified speed and the storage battery must vary in size and weight with the work required of the locomotive, and yet this variation in the size and weight of the storage battery must not interfere with the operation of the motor or the draw-bar pull or bring about conditions which will endanger the motor and storage battery.

I have by means of the present invention provided a single section storage battery locomotive so organized that these three elements, regardless of their variation, may be so related in making up the locomotive that these variations are readily taken care of so that any evil effects therefrom are eradicated. If, for example, the conditions at the mine required the user to have a locomotive with a draw-bar pull of a thousand pounds and a speed of three miles an hour to do the work desired by making ten trips a day, the motor, wheeled frame and storage battery would each have to be of a certain size, and be properly related, because of the conditions above set out. If, for example, this locomotive should be required to make fifteen trips per day of the same length as the ten trips hereinbefore referred to, the storage battery would necessarily have to be much greater in size and weight, and if this storage battery should be placed upon the wheeled frame, organized as it was for the locomotive making ten trips per day, then the elements would not be properly related, and the draw-bar pull would be greatly modified and would be either too small or too great because the weight upon the driving wheels would be too small or too great, in the first case reducing the draw-bar pull below the amount necessary to do the work—and in the second case, increasing the draw-bar pull so as to prevent the driving wheels from slipping at the maximum draw-bar pull for which the motor is designed, thus endangering the motor and the storage battery, for under such conditions, the motor is liable to be burned out and the storage battery too rapidly discharged, thus causing it to be injured.

One of the purposes of the present device is to provide a locomotive, in which when these conditions vary, the relation of the three elements above described may be varied accordingly so as to secure and maintain the proper draw-bar pull and the proper weight upon the driving wheels regardless of the variation in size and weight of the storage battery, thus insuring the proper work by the locomotive and insuring the motor and storage battery against injury.

The problem in a single section locomotive of properly relating the storage battery, the motor and the wheeled frame, is a difficult problem because to secure compliance with the varying conditions at the mines it is sometimes necessary to have the vertical line passing through the center of gravity of the storage battery pass through the center of the axle of the undriven wheels and in such cases the storage battery does not affect the weight on the driving wheels either to increase or decrease such weight. There are other conditions where it is necessary to have the vertical line passing through the center of gravity of the storage battery, pass between the center line of the axle of the undriven wheels and the center line of the axle of the driving wheels and this condition places a portion of the weight of the storage battery upon the driving wheels and there must be a considerable range in this direction so as to give sufficient variation in the proportion of the weight of the storage battery placed on the driving wheels. Again, there are conditions where it is necessary to have the center line of the axle of the undriven wheels between the center line of the axle of the driving wheels and the vertical line passing through the center of gravity of the storage battery and in such case the storage battery acts to decrease the weight on the driving wheels and there must be a considerable range in this direction so that this decrease can be varied to meet the conditions presented.

My present invention has another of its objects to provide in a single section storage battery locomotive a construction wherein any one of these arrangements, which the conditions at the mine requires, may be secured in the construction of the locomotive, so that the desired draw-bar pull may be provided and injury to the motor and storage battery prevented.

The invention is illustrated in the accompanying drawings, wherein

Fig. 1 is a side elevation of one form of locomotive embodying the invention.

Fig. 2 is a plan view of the locomotive illustrated in Fig. 1.

Fig. 3 is a side elevation of the locomotive shown in Fig. 1 with the side plate removed.

Fig. 4 is a diagrammatic view showing the electric circuits.

Like numerals refer to like parts throughout the several figures.

I have shown in the drawings a single section storage battery locomotive consisting of a wheeled frame, a motor for driving the same, said motor and wheeled frame forming a single, wheeled section, and a storage battery, the several parts related in a particular manner.

In this construction I provide two side pieces 1 which are preferably metal plates. Two driving wheels 2 are provided, said driving wheels being connected with an axle $2^a$ connected in any desired manner with the side plates.

There are also two undriven wheels 3 connected with an axle $3^a$ which is also connected to the side plates. A motor 5 is operatively connected with the driving wheels 2 as by being connected with the axle $2^a$ by suitable gearing, the motor being connected to a fixed part of the structure by the springs 4 which form an elastic connection. There is a storage battery 7 mounted and carried by the single section. Draw-bars 8 and 9 are located at the ends of the locomotive by means of which it may be connected with a car or a train of cars. The axle $2^a$ is mounted in journal boxes 10, one at each end thereof, said journal boxes being preferably movably mounted upon the side plates 1. In the construction shown, the side plates have openings cut therein for receiving the frames 11 in which the journal boxes are movably mounted. Springs 12 are located between the journal boxes and the frames 11. The locomotive may be provided with a suitable braking mechanism and sanding mechanism. The sanding mechanism consists of the two sand receptacles 13 and 14, one located over each wheel, said receptacles provided with sand-discharge pipes 15 and 16 on opposite sides of each driving wheel, so that sand may be applied when the locomotive is moving in either direction. The discharge of sand through the pipes 15 is controlled by a handle 17 (see Fig. 2) which is connected with a shaft 18 containing the crank 19 connected with the rod 20. This rod connects with a pull crank lever 21 which is connected with a shaft 22 controlling an out-let valve in the sand receptacle 13. A connecting rod 23 leads from the pull crank lever 21 to a crank 24 on a shaft 25 which controls a discharge valve in the sand receptacle 14, the parts being arranged so that when the handle 17 is moved, the two discharge valves will be opened to discharge sand through the discharge pipes 15. The discharge of sand through the pipes 16 is controlled by the handle 26 which is connected with a shaft 27, which controls the discharge valve in the sand receptacle 13. The crank 28 is connected with this shaft, which is in turn connected by a rod 29 with a crank 30 on the shaft 31, which controls the discharge valve in the sand receptacle 14. It will be seen that when the handle 26 is moved, sand will be discharged through the discharge pipes 16 on the opposite sides of the driving wheels. The braking mechanism is preferably arranged to apply to brakes on all of the wheels. As illustrated, this braking mechanism is controlled by the brake wheel 32. Connected with this brake wheel is a beveled gear 33 which engages a beveled gear 34 on the shaft 35 which passes through a threaded nut 36 connected with an arm 37 on the shaft 38. This shaft extends across the locomotive and has at each end a similar mechanism for applying the brakes to the two wheels on each side, this mechanism on each side consisting of a crank 39 connected with the shaft 38, the crank being connected with an arm 40 which is connected at the other end to a brake arm 41 to which the brake 42 for the driving wheel is attached, said brake arm being connected with a support 43 which is fastened to the frame. Connected with the brake arm 41 is the adjustable rod 44 which is connected with the brake arm 45 pivotally connected at 46 with some part of the frame and carrying the brake shoe 47 for the undriven wheel 3.

It will be seen that when the brake wheel 32 is turned to rotate the shaft 35 to move the nut 36 and the arm 37 upwardly, the shaft 38 is rocked and the cranks 39 are moved to the left (see Fig. 3). This moves the arms 40 so as to force the upper end of the brake arms 41 to the left (see Fig. 3), which forces the brake shoes 42 against the driving wheels and at the same time moves the rods 44 to the right, thus moving the lower ends of the brake arms 45 so as to force the brake shoes 47 against the undriven wheels.

The motor may be provided with any suitable electrical controlling apparatus. As shown in Fig. 2 I provide a controller 48, a reversing and charging device 48$^a$ and a resistance 49, 49$^a$, 49$^b$ and 49$^c$. I also provide headlights 50 and 51 at opposite ends of the locomotive. In Fig. 4 I have shown diagrammatically one arrangement of electric circuits for the motor and storage battery. The controller 48 may be the ordinary drum controller having a series of stationary contacts 52, 53, 54, 55, 56, 57 and 58 and a series of movable contacts 59, 60, 61, 62, 63, 64, 65 and 66 co-operating with the stationary contacts. The reversing device is a similar device having the stationary contacts 67, 68, 69, 70, 71, 72, 73 and 74 which co-operate with movable contacts 75$^a$, 75$^b$, 75$^c$ and 75$^d$ which are contacts for driving the locomotive forward, and the movable contacts 76, 76$^a$ and 76$^b$ which are the contacts for driving the locomotive in the reverse direction, and the movable contacts 77 and 77$^a$ for charging the battery. The motor 5 is provided with the field coils 79 and the armature 78. There is connected with the circuit a volt ammeter 80, an ampere meter 81, a gang switch 82, fuses 83 and 84 and a blow-out coil 85. The motor is connected in circuit with the entire battery through the positive terminal 86 and the negative terminal 87. The motor is controlled in the usual manner by the controller 48, which varies the resistance as the motor is started up, this being accomplished by the various contacts thereof in the usual manner, and is reversed by manipulating the reversing and charging device. The storage battery is charged by connecting the terminals 88 and 89 in the proper circuit, and this is done by moving the reversing and charging device so that the contacts 77 and 77$^a$ engage the contacts 67 and 68 and 73 and 74. In order to secure the proper weight upon the driving wheels to maintain the proper draw-bar pull and still permit the driving wheels to slip at the maximum draw-bar pull for which the motor is designed, and thereby prevent the motor and storage battery from being injured, the position of the storage battery with relation to the axle of the wheels 3 must be varied under different conditions presented, as herein before set out. In order to easily accomplish this, I prefer to make the side pieces 1 of the locomotive of metal plates, and these plates may be made up for the various locomotives, and when the conditions are ascertained which determine the draw-bar pull, the openings may then be cut in these plates for the reception of the ends of the axles of the wheels 3. It will thus be seen that these holes may be cut so as to bring the center of gravity of the storage battery directly over the axle of the wheels 3, and thus prevent any of the weight of the storage battery from coming upon the driving wheels 2 or this axle may be placed so that it is in the plane intermediate the center of gravity of the storage battery and the plane of the axle of the driving wheels 2, in which event, the storage battery instead of applying weight to the driving wheels, produces a condition which lessens the weight upon the driving wheels. These openings in the plate may be made so that the center of gravity of the storage battery is intermediate the vertical plane through the axles of the wheels 3 and 2, and in that event, a portion of the weight of the storage battery will be upon the wheels 2, and it will be seen that this weight may thus be controlled accurately by properly positioning the openings or holes in the side plates 1 and that these holes may be made at any point between the ends of the storage battery while the locomotive is being constructed so as to properly regulate this weight to meet the conditions presented.

I claim:

1. A storage battery locomotive comprising a storage battery and a single, wheeled section, said section having two driving wheels, an axle connecting said driving wheels and two undriven wheels, an axle connecting said undriven wheels, said two axles fixed against relative movement in a horizontal plane and an electric motor operatively connected with said driving wheels, said undriven wheels being smaller in diameter than the driving wheels, the storage battery mounted on said wheeled section above the undriven wheels, the driving wheels being outside of the boundary of said storage battery, said storage battery fixed against movement in a horizontal plane with relation to the axle of said undriven wheels.

2. A storage battery locomotive comprising a single, wheeled section having a frame with a high portion and a low portion, driving wheels connected with the high portion of said frame, an axle connecting said driving wheels, a motor carried by said high portion of the frame and operatively connected with said driving wheels, undriven wheels connected with the low portion of said frame, an axle connecting said undriven wheels, said axle fixed against movement in a horizontal plane with relation to said frame, and a storage battery supported wholly by said section, said storage battery mounted upon and carried by the low portion of the frame, the high portion of the frame projecting beyond said storage battery, said storage battery fixed against movement in a horizontal plane with relation to the axle of said undriven wheels.

3. A storage battery locomotive comprising a single, wheeled section and a storage battery supported wholly by said section, said section comprising a frame, two driving wheels, an axle connecting said driving wheels, two undriven wheels, an axle connecting said undriven wheels, said axle fixed against movement in a horizontal plane with relation to said frame, a motor and controlling apparatus therefor, said motor located above the axle connecting the driving wheels, said wheeled section having a high portion and a low portion, the driving wheels being connected with the high portion, said motor being operatively connected with said driving wheels, the undriven wheels being connected with the low portion of said section, the storage battery mounted upon and carried by said low portion, said storage battery fixed against movement in a horizontal plane with relation to the axle of said undriven wheels, the high portion of the section projecting beyond the storage battery.

4. A storage battery locomotive comprising a frame, a storage battery mounted upon said frame, undriven wheels connected with said frame and located below said storage battery, an axle connecting said undriven wheels, said storage battery fixed against movement in a horizontal plane with relation to the axle of said undriven wheels, a portion of the frame projecting beyond said storage battery, driving wheels connected with said latter portion of the frame, an axle connecting said driving wheels and a motor operatively connected with said driving wheels, and a draw-bar connected with said frame at a point underneath said storage battery.

5. A storage battery locomotive comprising a single, wheeled section having a frame, an axle connected with said frame, driving wheels on said axle, a second axle connected with said frame, undriven wheels on said axle, a motor operatively connected with said driving wheels, a storage battery wholly carried by said section, said storage battery operatively connected with said motor and means for safeguarding the motor and storage battery which consists in connecting the axle of the undriven wheels with the frame at either side of the vertical line passing through the center of gravity of the storage battery so as to regulate the weight on the driving wheels to a predetermined weight which will permit the driving wheels to slip before the motor becomes over-loaded, thereby preventing injury to the motor or the battery.

6. A storage battery locomotive comprising a storage battery and a single, wheeled section, said storage battery wholly carried by said section, said section comprising two undriven wheels, an axle with which they are connected, said axle extending beneath the storage battery, two side metal plates, means for safeguarding the motor and storage battery which consists in connecting the axle for the driving wheels with said metal plates, a portion of each metal plate between the axle of the driving wheels and the rear end thereof being cut away to form slots into which the axles for the undriven wheels project, said plates being cut away at the time the locomotive is built so that the axle of the undriven wheels can be located in any vertical plane between the ends of the storage battery to adjust the weight on the driving wheels.

7. A storage battery locomotive comprising a storage battery, a single, wheeled section, said storage battery wholly carried by said section, two driving wheels, an axle connected therewith, two side pieces forming a part of said wheeled section, the axle of the driving wheels being connected with the said side pieces, two undriven wheels, an axle with which they are connected, means for safeguarding the motor and storage battery which consists in connecting the axle of the undriven wheels with said side pieces in a vertical plane at any point between the ends of the storage battery when the locomotive is being constructed so as to regulate the weight on the driving wheels.

8. A storage battery locomotive comprising a single wheeled section having a frame, an axle connected with said frame, driving wheels on said axle, a second axle connected with said frame, undriven wheels on said second axle, a motor operatively connected with said driving wheels, a storage battery wholly carried by said section, said storage battery being operatively connected with said motor, means for safeguarding the motor and storage battery which consists in connecting the axles of the undriven wheels with said frame on that side of the vertical line passing through the center of gravity of the storage battery which will decrease the weight on the driving wheels, so as to permit the driving wheel to slip before the motor becomes overloaded, thereby preventing injury to the motor or the battery.

9. A storage battery locomotive comprising a single wheeled section having a frame, an axle connected with said frame, driving wheels on said axle, a second axle connected with said frame, undriven wheels on said axle, a motor mounted on said frame above the axle of the driving wheels and operatively connected with said driving wheels, said frame being provided with a portion which projects beyond said motor, a storage battery wholly carried by said section, said storage battery mounted on that portion of said frame which projects beyond said motor and being operatively connected with said motor, and means for safeguarding the motor and storage battery which consists in connecting the axle of the undriven wheels with the frame at either side of the vertical line passing through the center of gravity of the storage battery so as to regulate the weight on the driving wheels to a predetermined weight which will permit the driving wheels to slip before the motor becomes overloaded, thereby preventing injury to the motor or the battery.

In testimony whereof, I affix my signature in the presence of two witnesses this 19th day of April, 1917.

CHARLES A. PRATT.

Wtnesses:
 RUTH E. CARLSON,
 LYDIA M. SYLVANUS.